US008849892B2

(12) United States Patent
Espino

(10) Patent No.: US 8,849,892 B2
(45) Date of Patent: Sep. 30, 2014

(54) METHOD AND SYSTEM FOR BROKERING MESSAGES IN A DISTRIBUTED SYSTEM

(75) Inventor: Mayel Espino, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1940 days.

(21) Appl. No.: 10/865,465

(22) Filed: Jun. 10, 2004

(65) Prior Publication Data

US 2005/0278410 A1  Dec. 15, 2005

(51) Int. Cl.
*G06F 15/16* (2006.01)
*G06F 3/12* (2006.01)
*G06F 17/30* (2006.01)
*G06F 21/12* (2013.01)
*G06F 9/45* (2006.01)
*H04L 29/08* (2006.01)
*H04L 29/06* (2006.01)

(52) U.S. Cl.
CPC .............. *G06F 15/16* (2013.01); *G06F 3/1246* (2013.01); *G06F 17/30896* (2013.01); *G06F 21/128* (2013.01); *G06F 8/423* (2013.01); *H04L 29/08072* (2013.01); *H04L 29/06* (2013.01); *H04L 2029/06054* (2013.01)
USPC ........................................................ 709/203

(58) Field of Classification Search
CPC .............. H04L 29/08072; H04L 29/06; H04L 2029/06054; G06F 3/1246; G06F 17/30896; G06F 21/128; G06F 8/423
USPC ........... 709/230, 202, 206, 231, 203; 704/270
See application file for complete search history.

(56) References Cited

U.S. PATENT DOCUMENTS

| 5,293,488 | A | * | 3/1994 | Riley et al. ..................... 709/244 |
|---|---|---|---|---|
| 5,420,852 | A | * | 5/1995 | Anderson et al. .............. 370/364 |
| 5,430,727 | A | * | 7/1995 | Callon ........................... 370/401 |
| 5,768,503 | A | | 6/1998 | Olkin ................................ 726/5 |
| 5,790,809 | A | * | 8/1998 | Holmes ......................... 709/228 |
| 5,835,724 | A | * | 11/1998 | Smith ........................... 709/227 |
| 5,870,605 | A | | 2/1999 | Bracho ......................... 719/318 |
| 5,928,335 | A | | 7/1999 | Morita .......................... 709/203 |
| 6,005,568 | A | * | 12/1999 | Simonoff et al. .............. 715/744 |
| 6,078,321 | A | * | 6/2000 | Simonoff et al. .............. 715/744 |
| 6,088,796 | A | | 7/2000 | Cianfrocca ................... 713/152 |
| 6,091,412 | A | * | 7/2000 | Simonoff et al. .............. 715/749 |
| 6,158,007 | A | | 12/2000 | Moreh ............................ 726/1 |
| 6,189,143 | B1 | * | 2/2001 | Simonyi ........................ 717/109 |

(Continued)

FOREIGN PATENT DOCUMENTS

EP        926861 A1 *  6/1999  .............. H04L 12/58

OTHER PUBLICATIONS

Wahl et al., "Lightweight Directory Access Protocol (v3)", Dec. 1997.*

(Continued)

*Primary Examiner* — Ondrej Vostal

(57) ABSTRACT

A system and method for brokering messages in a distributed system is disclosed, in which a resource, such as a hypertext file specified by a user agent, is preprocessed to request the services of a message broker configured to communicate messages among a plurality of non-compatible clients and servers for sending a message to an application at an application server in a protocol not supported by the user agent. In response, markup is generated and sent back to the user agent.

30 Claims, 10 Drawing Sheets

(56) References Cited

U.S. PATENT DOCUMENTS

| | | | |
|---|---|---|---|
| 6,304,967 B1* | 10/2001 | Braddy | 713/150 |
| 6,327,594 B1* | 12/2001 | Van Huben et al. | 1/1 |
| 6,415,331 B1 | 7/2002 | Ariga | 709/246 |
| 6,438,594 B1* | 8/2002 | Bowman-Amuah | 709/225 |
| 6,460,039 B1 | 10/2002 | Pinter | 707/10 |
| 6,463,429 B1 | 10/2002 | Geppert | 707/3 |
| 6,483,846 B1 | 11/2002 | Huang | 370/445 |
| 6,493,717 B1* | 12/2002 | Junkin | 707/754 |
| 6,611,862 B2* | 8/2003 | Reisman | 709/217 |
| 6,611,955 B1 | 8/2003 | Logean | 717/128 |
| 6,615,253 B1* | 9/2003 | Bowman-Amuah | 709/219 |
| 6,693,899 B1* | 2/2004 | Makridakis | 370/356 |
| 6,704,750 B2 | 3/2004 | Asazu | 707/104.1 |
| 6,779,154 B1* | 8/2004 | Nussbaum et al. | 715/234 |
| 6,901,052 B2* | 5/2005 | Buskirk et al. | 370/235 |
| 6,920,502 B2* | 7/2005 | Araujo et al. | 709/229 |
| 6,940,870 B2* | 9/2005 | Hamlin | 370/466 |
| 6,961,330 B1* | 11/2005 | Cattan et al. | 370/352 |
| 6,981,212 B1* | 12/2005 | Claussen et al. | 715/205 |
| 7,003,528 B2* | 2/2006 | Dan et al. | 707/102 |
| 7,136,896 B1* | 11/2006 | Srinivas et al. | 709/203 |
| 7,149,690 B2* | 12/2006 | August et al. | 704/270 |
| 7,206,853 B2* | 4/2007 | Eytchison et al. | 709/230 |
| 7,216,181 B1* | 5/2007 | Jannu et al. | 709/246 |
| 7,243,355 B2* | 7/2007 | Espino | 719/328 |
| 7,289,964 B1* | 10/2007 | Bowman-Amuah | 705/1.1 |
| 7,327,756 B2* | 2/2008 | Hamlin | 370/466 |
| 7,359,936 B2* | 4/2008 | Gruen et al. | 709/203 |
| 7,366,777 B2* | 4/2008 | Hill et al. | 709/226 |
| 7,398,527 B2* | 7/2008 | Hamdan et al. | 719/311 |
| 7,729,919 B2* | 6/2010 | Wang | 704/275 |
| 7,752,258 B2* | 7/2010 | Lewin et al. | 709/203 |
| 7,792,948 B2* | 9/2010 | Zhao et al. | 709/224 |
| 8,069,435 B1* | 11/2011 | Lai | 717/106 |
| 8,195,714 B2* | 6/2012 | McKibben et al. | 707/804 |
| 2002/0073236 A1* | 6/2002 | Helgeson et al. | 709/246 |
| 2002/0116513 A1* | 8/2002 | Heinonen | 709/230 |
| 2003/0005019 A1* | 1/2003 | Pabla et al. | 709/1 |
| 2003/0013951 A1* | 1/2003 | Stefanescu et al. | 600/407 |
| 2003/0028378 A1* | 2/2003 | August et al. | 704/260 |
| 2003/0058277 A1* | 3/2003 | Bowman-Amuah | 345/765 |
| 2003/0065810 A1* | 4/2003 | Ims et al. | 709/232 |
| 2003/0067912 A1* | 4/2003 | Mead et al. | 370/389 |
| 2003/0078960 A1* | 4/2003 | Murren et al. | 709/203 |
| 2003/0101134 A1* | 5/2003 | Liu et al. | 705/39 |
| 2003/0115458 A1* | 6/2003 | Song | 713/165 |
| 2003/0154266 A1* | 8/2003 | Bobick et al. | 709/223 |
| 2003/0187979 A1* | 10/2003 | Hekstra et al. | 709/224 |
| 2004/0044731 A1* | 3/2004 | Chen et al. | 709/203 |
| 2004/0073549 A1* | 4/2004 | Turkel et al. | 707/5 |
| 2004/0133855 A1* | 7/2004 | Blair et al. | 715/517 |
| 2004/0148318 A1* | 7/2004 | Taylor et al. | 707/203 |
| 2004/0148565 A1* | 7/2004 | Davis et al. | 715/501.1 |
| 2004/0172484 A1* | 9/2004 | Hafsteinsson et al. | 709/246 |
| 2004/0205136 A1* | 10/2004 | Whittenberger et al. | 709/206 |
| 2004/0205564 A1* | 10/2004 | Brayton et al. | 715/513 |
| 2004/0210836 A1* | 10/2004 | Fablet | 715/513 |
| 2004/0214622 A1* | 10/2004 | Atkinson | 463/1 |
| 2004/0216050 A1* | 10/2004 | Ono | 715/536 |
| 2004/0216139 A1* | 10/2004 | Rhoda et al. | 719/320 |
| 2004/0264465 A1* | 12/2004 | Dunk | 370/392 |
| 2005/0002417 A1* | 1/2005 | Kelly et al. | 370/466 |
| 2005/0038897 A1* | 2/2005 | Clarke | 709/230 |
| 2005/0044159 A1* | 2/2005 | Niemi et al. | 709/207 |
| 2005/0071423 A1* | 3/2005 | Rajaniemi | 709/203 |
| 2005/0135347 A1* | 6/2005 | Creamer et al. | 370/353 |
| 2005/0172276 A1* | 8/2005 | Eilebrecht | 717/143 |
| 2005/0177635 A1* | 8/2005 | Schmidt et al. | 709/226 |
| 2005/0182790 A1* | 8/2005 | Gilbert et al. | 707/104.1 |
| 2005/0188076 A1* | 8/2005 | Rayburn et al. | 709/224 |
| 2005/0216856 A1* | 9/2005 | Matti | 715/768 |
| 2005/0246343 A1* | 11/2005 | Burns et al. | 707/10 |
| 2005/0267772 A1* | 12/2005 | Nielsen et al. | 705/1 |
| 2005/0273514 A1* | 12/2005 | Milkey et al. | 709/232 |
| 2006/0020883 A1* | 1/2006 | Kothari et al. | 715/513 |
| 2009/0300161 A1* | 12/2009 | Pruitt et al. | 709/224 |

OTHER PUBLICATIONS

Crispin, "Internet Message Access Protocol—version 4rev1", Mar. 2001.*
Crispin, "Interactive Mail Access Protocol—version 2", Jul. 1988.*
Green, "What is PHP?", Zend Technologies, 2002.*
Buraga et al., "Using XML Technologies for Information Integration within an E-Enterprise", May 2004.*
Badros, "The Extensible Templating Language: An XML-based Restricted Markup-Generating Language", 2003.*
Royappa, "The PHP Web Application Server", Mar. 2000.*
Ogbuji, "Validating XML with Schematron", 2000.*
Garguillo et al., "Guidelines for the Evaluation of Electronic Data Interchange Products", 1995.*
Bort et al., "Handbook of EDI", 1997 Edition.*
Gallego et al., "Distributed Models for Brokerage on Electronic Commerce", 1998.*
Harold et al., "XML in a Nutshell", 2001.*
Marti et al., "Use of WWW Technology for Client/Server Applications in Multimediator", 1997.*
XML Solutions Corporation, "XEDI.org XML and EDI: Peaceful Co-Existence", 1999.*
EXTOL Inc., "XML: To Be or Not to Be ?", 2000.*

* cited by examiner

METHOD AND SYSTEM FOR BROKERING MESSAGES IN A DISTRIBUTED SYSTEM

FIELD OF THE INVENTION

The present invention relates to information technology (IT) and more particularly to brokering messages in a distributed computing system.

BACKGROUND OF THE INVENTION

Distributed computing is a technique for allocating application data processing among several computing resources. In the information technology industry, there is much interest in distributed computing due to the efficiencies gained by utilizing several different processors for common applications. Some distributed computing platforms are known as client/server platforms, because each computing resource represents either a client or a server. A client resource is a consumer of application services and operates by sending requests to a server over a network. Clients generally represent the users of a system, such as a person at an application workstation. A server resource is a provider of application services and operates by receiving request messages from clients, performing data processing based on those requests, and sending reply messages to the clients. Servers generally represent the components that maintain enterprise data resources and implement business policies.

Implementation of a distributed platform often involves the integration of various types of heterogeneous computing and network resources into a single, enterprise-wide network. There are many products, standards, and communication protocols available for doing this, and many enterprises make use of several of them. This heterogeneity creates a significant problem with regards to interoperability. Several different applications running on various operating systems and hardware may interface with numerous incompatible messaging and network communication protocols. Application programmers have to deal with the complexities and intricacies of all of these protocols in order for their applications to work in heterogeneous distributed computing environments.

Additionally, programmers may need to provide a means for their applications to determine optimal transport mechanisms for their messages. This may be needed on both client and server resources. At least one message broker has been developed for transport of messages, such as the one described in the commonly-assigned U.S. Pat. No. 5,790,809 issued on Aug. 4, 1998, to Ralph Holmes, entitled REGISTRY COMMUNICATIONS MIDDLEWARE, the contents of which are hereby incorporated by reference in their entirety.

The increasing popularity and heterogeneity of distributing computing systems, however, have emphasized the importance of finding approaches that can scale well, especially in terms of deploying and maintaining distributed systems, in the presence of many more users and diverse types of applications than previously thought feasible. A need therefore exists for an approach to brokering messages in a distributed system that is scalable in terms of current demands for numbers of users and diversity of application servers.

SUMMARY OF THE INVENTION

The present invention stems from the recognition that one impediment to scalability is in the diversity of client-side computing devices for providing the user interface aspect to distributed applications. For example, if each client-side device had to include its own component of a message brokering system, then deploying a new or upgrading a message brokering infrastructure would require updating the message brokering component installed on each of the diversity of client-side computing devices.

Accordingly, this need for scalability in a distributed system, as well as other needs, is addressed by the present invention by providing a resource containing markup and at least one instruction, such as a file specified by browser or other kind of a user agent, that can be preprocessed at a server to request the services of a message broker configured to communicate messages among a plurality of non-compatible clients and servers. Each server can be handled by many clients, and the resource can be used or distributed to many servers, resulting in a leverage effect that increases scalability since upgrades can be deployed by updating the smaller number of servers or even the common resource. In addition, updating the resource can preferably be facilitated when the specified resource is a file containing markup, for example, text added to the data of a document to convey information about the document, such as descriptive markup (tags), references, markup declarations, and processing instructions.

One aspect of the present invention relates to a server for exchanging messages over a distributed system, comprising a message broker, a storage device, and a preprocessor. The message broker is configured for encapsulating and exchanging messages among a plurality of clients and servers using incompatible protocols, and the storage device stores a resource (such as a file) containing markup and at least one instruction for calling a message broker to communicate the message to an application at an application server. The preprocessor is configured for preprocessing the resource in response to a communication from a user specifying the resource. In response to executing the instruction, the message broker is called to communicate the message to the application at the application server in a protocol not supported by the user agent. Markup is generated based on the markup contained in the resource and sent to the user agent. The instructions may be written in any language, especially a server-side language such as PHP, ASP, Perl, or ColdFusion, that outputs hypertext markup, performs a variety of processing, and then returns with markup for the client to render.

Another aspect of the present invention pertains to a method of communicating a message in a distributed computer system from a user agent to an application at an application server. In accordance with such a method, a communication from a user agent is received identifying a resource stored at a server, such as a hypertext GET or POST message generated by a browser. The resource, which may be a hypertext file, contains markup and at least one instruction for calling a message broker to communicate the message to the application at the application server. In response, the resource is preprocessed and the instruction is executed so that the message broker is called to communicate the message to the application at the application server in a protocol not supported by the user agent. Markup is generated based on the markup contained in the resource and sent back to the user agent.

Still another aspect of the present invention involves a computer-readable medium storing a resource containing markup and one or more instructions for communicating a message in a distributed computer system from a user agent to an application at an application server. The one or more instructions are configured to be preprocessed by a hypertext server in response to a communication from a user agent identifying the computer-readable medium. When executed, the instructions cause one or more processors to call a message broker to communicate the message to the application at the application server in a protocol not supported by the user agent and generate markup based the markup contained in the resource.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7b is a continuation of the flowchart of FIG. 7a; and

DESCRIPTION OF THE PREFERRED EMBODIMENT

A system, method, and software for brokering messages in a distributed system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Overview of Message Registry and Brokering

Figure 1:
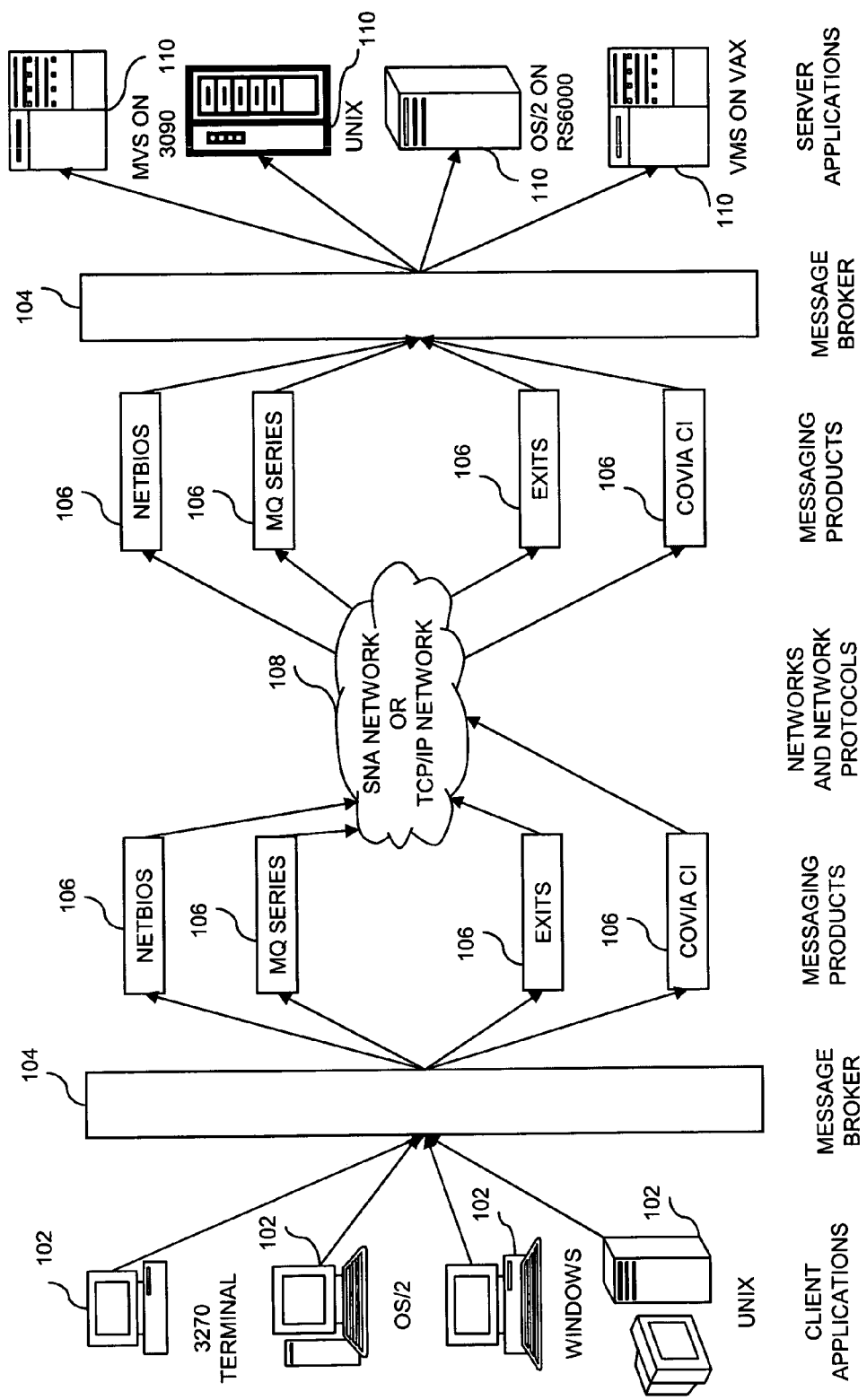
FIG. 1 is a diagram of a high-level systems architecture of an exemplary distributed computing platform utilizing a message broker.

Referring to FIG. 1, a message broker 104 is depicted as a single, standard interface to both client 102 and server applications 110. The message broker 104 can be thought of as a system that resides on each individual client and server resource, and may be implemented as a library to provide a single, standard interface to each client 102 and server application 110 to shield these applications from the complexities of various proprietary messaging products 106 and network protocols 108. The operating systems, messaging products 106, and network protocols 108 shown are only a sample of those that may be supported by the message broker 104.

The message broker 104 may accept request messages from Client applications 102 as part of a dialog. The client applications 102 may run under various operating systems, as indicated. The request messages represent a solicitation for a response and/or an instruction to perform a process. They are generated by the client applications 102 with the intent of being delivered to a server application 110. Server application 110 may also be run under various operating systems, as shown. Since the message broker 104 software resides on the same hardware components as the applications, the link between the message broker 104 and the client applications 102 represents a software process. Although four examples of operating systems and terminal emulators are illustrated, the message broker 104 may support many more.

The message broker 104 then executes a process of encapsulating the client's 102 request message into a message-broker-defined message. This process is depicted in greater detail below. The message broker 104 determines the appropriate messaging product 106 and then converts the message into the proprietary protocol of this messaging product 106. In some situations, the message broker 104 may actually serve as the messaging product 106; in these cases, it will convert the message to the proprietary protocol of the network transport 108 (e.g., Systems Network Architecture (SNA) LU6.2, Transmission Control Protocol over Internet Protocol (TCP/IP), etc.).

The messaging product 106 will use an appropriate network protocol for transporting the message over an available network 108. At the other end, the messaging product 106 receives the message and passes it off to the server-side message broker 104. The message broker 104 converts the message from the proprietary protocol of the messaging product 106 to a message that is recognizable to the server application 110. If a response from the server application 110 is appropriate, the preceding process is repeated to send the response message back to the client application 102.

Figure 2:
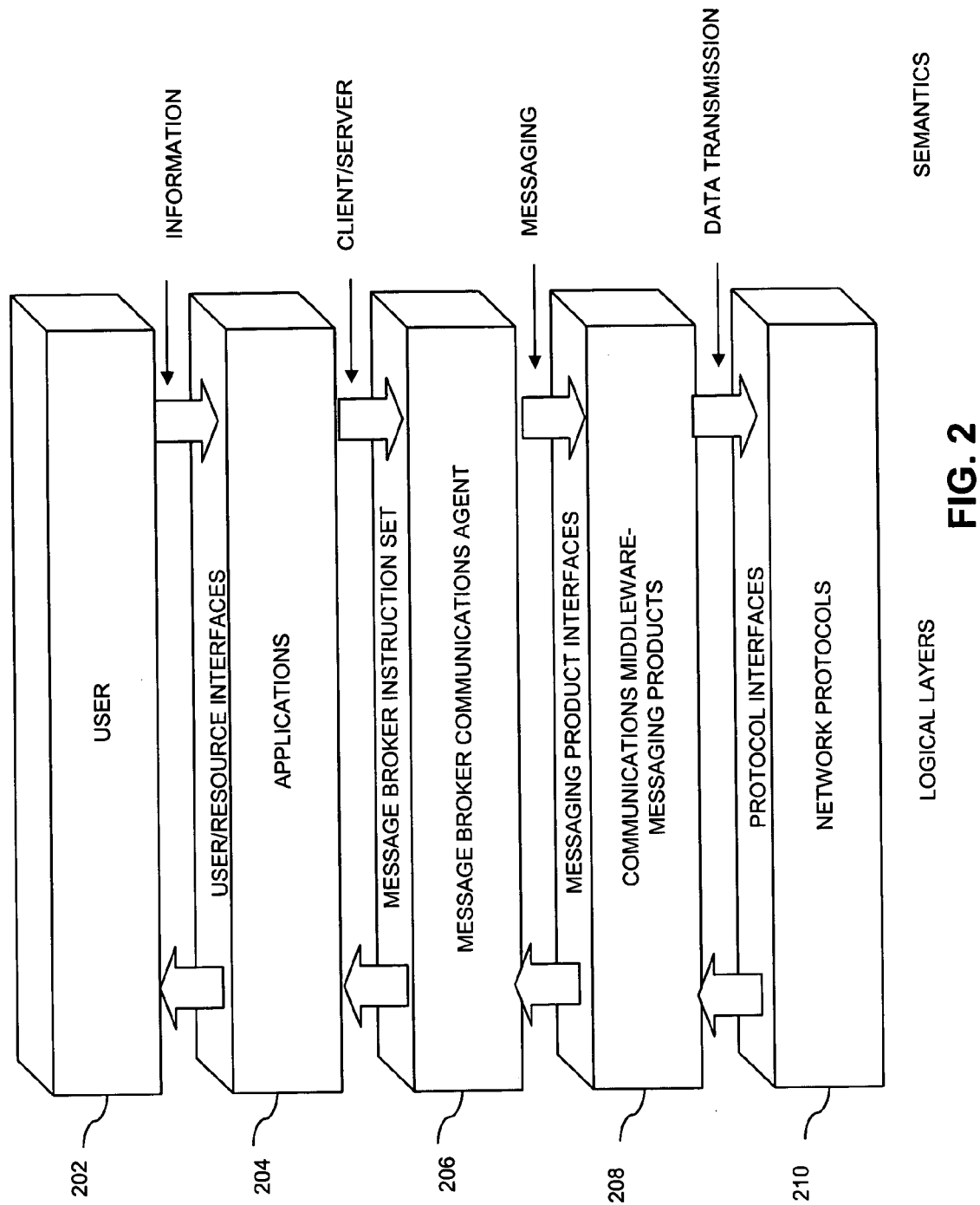
FIG. 2 is an exemplary diagram of logical layers of client/server communications illustrating a relationship of the message broker with system communications.

Referring to FIG. 2, the role that the message broker 104 assumes in logical layers of client/server communications is illustrated. In this diagram, the resource is identified on the front of each layer, the interface it provides is identified on the top of each layer, and the semantics used in the interface are identified to the right of each layer.

A top layer 202 represents the user of the application who interfaces with an application via application-defined user/resource interfaces, exchanging business-oriented information with the application.

The next layer down 204 represents the application, interfacing with the message broker 104 via use of a set of message broker instructions. The semantics used for the message broker instructions are business-oriented client/server transactions, and represent the only protocol that the application programmers need to deal with.

Next down are layers 206 and 208. The layer 206 next represents the message broker communications agent. The message broker communications agent interfaces with messaging products (i.e., communications middleware) via product-specific interfaces. The semantics used are specific to the messaging product. The layer 208 represents the communications middleware messaging products, which interface with the network via network protocol interfaces, using data transmission semantics. A bottom layer 210, representing network protocols, may include such types as SNA LU6.2 or TCP/IP.

In some cases, the message broker communications agent 206 may actually span across the communications middleware layer 208. For example, the message broker communications agent 206 may translate client request messages into actual TCP/IP messages to send directly over the TCP/IP network.

Exemplary Message Broker Structure and Instructions

Figure 3:
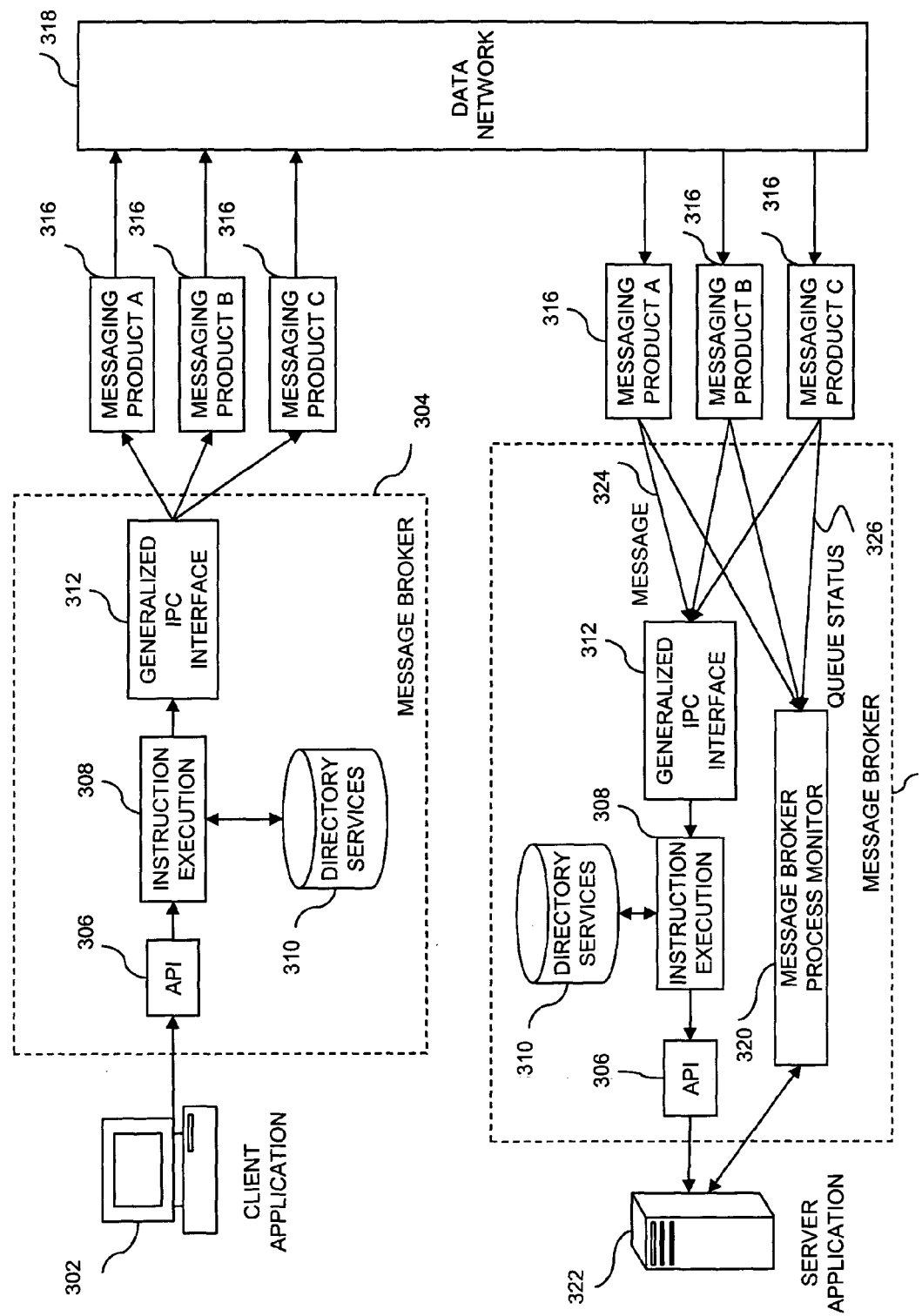
FIG. 3 is a diagram illustrating an exemplary internal architecture of the message broker, and a single thread of a distributed computing platform utilizing it.

Referring to FIG. 3, an exemplary internal logical structure of the message broker 104 is shown to illustrate a typical client/server conversation utilizing the message broker 104.

A client application 302 generates a request message that needs to be sent to a distant server application 322. A typical example of a request message may be a request for a customer's monthly billing revenue from a company's customer billing database located on a distant server. The client and server are connected by an enterprise data network 318, and have several messaging products 316 available to transport their messages over the network 318. They will use the message broker 304 as an interface to all of these messaging products 316 and network 318 protocols.

The client application 302 communicates with message broker 304 via an Application Programming Interface (API) 306 of the message broker. The API may include a set of exemplary message broker instructions as follows:

The message broker instruction set is a set of commands that the message broker 304 uses to communicate with both client 302 and server applications 322. This exemplary limited set of commands represents a communications protocol that client/server application programmers may use for their applications to communicate with the message broker 304 and, thus, the enterprise network.

There are two sets of instructions: one for use by client applications 302, and one for use by server applications 322. Since an application can potentially function as either a client or a server, both sets of instructions are included in the instruction set for every application. As noted previously, the instruction set is maintained within the API 306 of the message broker 304, as well as each client 302 and server application 322.

The client instructions and their parameters may be specified as follows:

REGISTER—Establishes a session between the calling application and the message broker 304. This session is between the calling application and the message broker 304, and not between applications. The session includes a message broker control area, which is memory allocated by the REGISTER instruction in the message broker and passed back to the calling application. The message broker control area represents a unique instance of the registering process, and a new message broker control area is established for each issuance of the REGISTER instruction by the client.

Parameters of REGISTER:

FEEDBACK—Field used to return to the calling application an indication as to whether the message broker 304 was able to complete the function requested.

REG-OPTIONS—This parameter contains several fields, most of them optional, providing information used to identify the client application 302. One field of this parameter is a one-character designation indicating whether the calling application is a client or a server.

MBCA-PTR—Field used to uniquely identify the message broker control area by serving as a pointer to the message broker control area. It designates a specific session established by a REGISTER instruction, and identifies subsequent calls to the message broker 304 as part of a specific session. Each issuance of the REGISTER instruction designates a different session and therefore has a different value for this field (e.g., MBCA-PTR1, MBCA-PTR2, etc.).

DEREGISTER—Terminates activities of the client/server applications, and releases any associated message broker managed resources. Parameters may be the same as those for REGISTER.

SENDREQUEST—Used to send a client request to a server. May include the same parameters as REGISTER, plus the following:

WS-TEST-MSG—This field is the address of the actual message being sent by the client to the Server.

WS-MSG-LEN—This field indicates the length of the client message.

RECEIVEREPLY—Used to receive a reply to a previous request. The message broker control area is the same one used for the SENDREQUEST verb. RECEIVEREPLY may include the same parameters as REGISTER, plus the following:

WS-OUT-MSG-PTR—This field is a pointer to the reply message.

WS-OUT-MSG-LEN—This field indicates the length of the reply message.

CONVERSE—Used to conduct a synchronous request/reply transaction. CONVERSE may include the same parameters as SENDREQUEST and RECEIVEREPY combined.

The Server instructions and their parameters may be specified as follows:

REGISTER—Same definition as client version of instruction. A server issues a REGISTER instruction in response to the message broker's request to do so.

DEREGISTER—May have the same definition as the client version of DEREGISTER.

RECEIVEREQUEST—Used to receive a request message sent by the client. The message itself will be received unmodified by the message broker 304, and then may be processed by the server. RECEIVEREQUEST may include the same parameters as REGISTER, plus the following:

WS-REQUEST-MSG—This field is the address of the message being sent to the server by the client.

WS-REQUEST-LEN—This field indicates the length of the message.

SENDREPLY—Used to send the server's reply to the client's message. SENDREPLY may include the same parameters as REGISTER, plus the following:

WS-SENDREPLY-MSG—This field is the address of the reply to be sent to the client by the server.

WS-SENDREPLY-LEN—This field indicates the length of the reply.

With continued reference to FIG. 3, the client application 302 initiates a session by registering itself as a client with the message broker 304, which is accomplished by issuing a REGISTER verb, which is read by the API 306. A message broker component identified as the Instruction Execution 308 validates the parameters and processes each instruction. When a REGISTER instruction is received by the API 306, instruction execution 308 generates a message broker control area and sends the message broker control area address back to the client 302 via the API 306. This message broker control area is used to store and process communications between the client 302 and the message broker 304.

The client application 302 then issues a SENDREQUEST instruction to the message broker 304. SENDREQUEST commands the message broker 304 to send the client's request message, generated previously by the client 302, to the server 322. The actual request message will also be sent to the message broker 304 as a parameter of the SENDREQUEST instruction. This message is in a format defined by the specific client application 302 that generated it, and will remain unmodified by the message broker 304. The message broker 304 simply delivers it to the server 322.

Alternatively, the client 302 may issue a CONVERSE instruction, which establishes a two-way, conversational dialog with the server 322. This may be considered equivalent to issuing a SENDREQUEST and RECEIVEREPLY instruction in combination. By issuing solely a SENDREQUEST instruction, the client 302 may establish either a conversational or a one-way dialog with the server 322, depending on the instruction's parameters.

With continued reference to FIG. 3, the SENDREQUEST instruction is received and recognized by the API 306. The message broker 304 then initiates the instruction execution 308 process.

The instruction execution 308 process validates the parameters of the instruction and resolves the destination address. It reads, from the client application's message, the name of the server application 322 for which the client's request is intended. It then queries a directory services database 310 to determine the physical network destination for that server application 322. The directory services database 310 includes physical network routing codes for each client/server application on the network. When a request or reply message is passed to the message broker 304 to deliver to a specific application on the network, the message broker 304 determines where that application resides by translating its name to a physical network node via the directory services database 310. Thus, when an application is migrated to another node on the network, it is possible to update only the directory services database 310, as opposed to updating every client/server application.

In an exemplary embodiment, the network destination of an application is represented by a three-part name, including a domain, a service name, and a service qualifier. The domain refers to a distinct sub-network of the enterprise-wide network. The service name refers to the function, rather than the physical location of the destination node and is the identifier of the destination. The service qualifier refers to a specific instance of the service name function, in cases where there is more than one instance. An example would be specifying a service name function of geographical customer data into service qualifiers of "east" and "west."

With continued reference to FIG. 3, the instruction execution 308 launches execution of the SENDREQUEST instruction by issuing a Generalized IPC (Inter-Process Communications) Request to a generalized IPC interface 312. IPC refers to components and processes between the message broker 304 at the client 302 end and the message broker 304 at the server 322 end and includes messaging products 316, data networks 318, and anything that supports the communications between the client processes and the server processes.

The generalized IPC interface 312 is the component of the message broker 304 that is responsible for selecting the appropriate IPC products for transporting the client's message to the server 322. The generalized IPC interface 312 includes a generalized view of all of the messaging 316 and Network 318 products available, and selects one for use in the current session. It is also responsible for translating the message envelope (the message itself remains unmodified) to the appropriate format of the selected IPC product. The generalized IPC request is a command issued by the instruction execution 308 process to the generalized IPC interface 312. It includes the client's message, server's network address, and a request to send the message.

Figure 4:
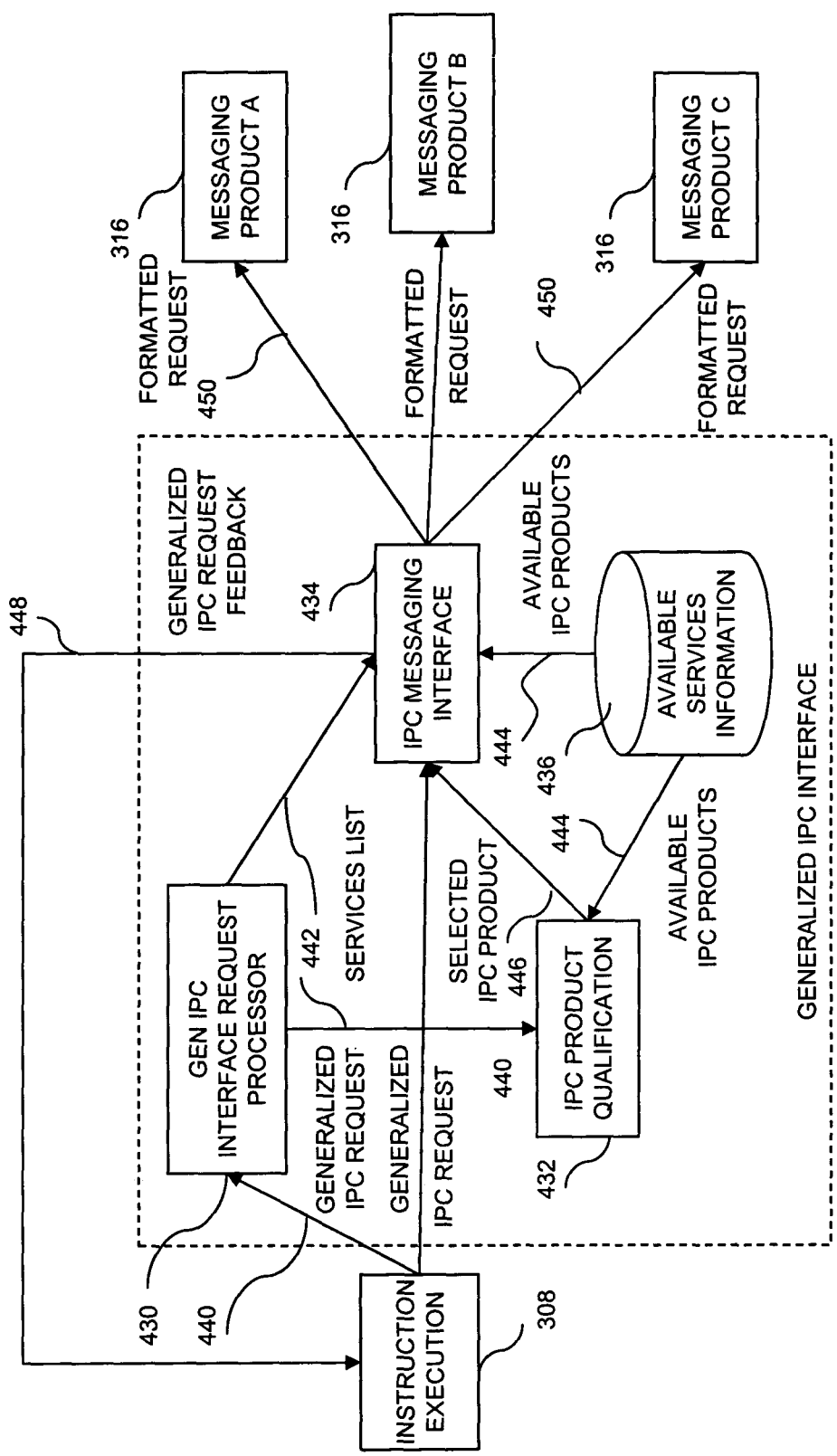
FIG. 4 is an exemplary dataflow diagram illustrating a Generalized Inter Process Communication (IPC) Interface.

The generalized IPC interface 312 is shown in greater detail in FIG. 4, which is a dataflow diagram illustrating the operation of the Interface 312. Referring to FIG. 4, the generalized IPC interface 312 is identified within a broken line. It includes three primary logical components: a generalized IPC interface request processor 430, an IPC product qualification 432, and an IPC messaging interface 434. It also includes a database of available services information 436, which may be a partitioned database of the directory services database 310, or a separate database.

The generalized IPC interface request processor 430 provides a formal and initial interface to the instruction execution 308. The generalized IPC interface request processor 430 receives a generalized IPC request 440 and determines what services may be appropriate to process the request. It then compiles these services into a services list 442, which is forwarded to the IPC product qualification 432. The services list 442 can be a set of data items, each item identifying a message-broker-defined service that may appropriately process the request. Examples of such services are persistent queuing, message recovery, and time-out.

The IPC product qualification component 432 determines which messaging product 316 is to be used for transporting the client's message over the data network 318. This determination may be based on two inputs: the services list 442 from the request processor 430, and a list of available IPC products 444 from the available services information database 436. The available services information database 436, which may reside with the directory services database 310, includes preprogrammed lists of available IPC products (which includes messaging products 316 and data network 318 protocols) and information regarding their conditions for use. Based on the content of the services list 442 for the particular request, and the available IPC products 444, the IPC product qualification component 432 selects an appropriate IPC product 316 to use. It then sends the identification of this selected IPC product 446 to the IPC messaging interface 434.

The IPC messaging interface 434 provides the message broker's interface to the selected IPC products, including the selected messaging product 316. As previously noted, IPC refers to components utilized for transporting the message from the client's message broker 304 to the server's message broker 304; this may include primarily industry-standard messaging products 316 and data network products 318. The IPC messaging interface 434 translates the generalized IPC request 440 to a format specified and utilized by the selected messaging product 316 and also initiates a dialog with the messaging product 316. When the generalized IPC request 440 (which includes the client's native request message) is translated to an appropriate messaging product 316 format, a formatted request 450 is passed to the messaging product 316 for transport over the data network 318 to a distant server 322.

Referring back to FIG. 3, at the server end, the messaging product 316 receives the message from the network 318, and delivers the message 324 to the message broker 304 via the generalized IPC interface 312. This delivery of the message 324 to the message broker 304, along with the entire process conducted by the message broker 304 at the server end, is controlled by a message broker component identified as a message broker process monitor 320. The message broker process monitor 320 controls the server's 322 receiving and processing of messages. Its objectives are to maintain a high level of server throughput of messages, manage the desired number of server tasks to process workloads, control server capacity and utilization by terminating/reactivating server tasks as workload demands change, and to provide application-defined mechanisms for controlling server resource allocation.

Figure 5:
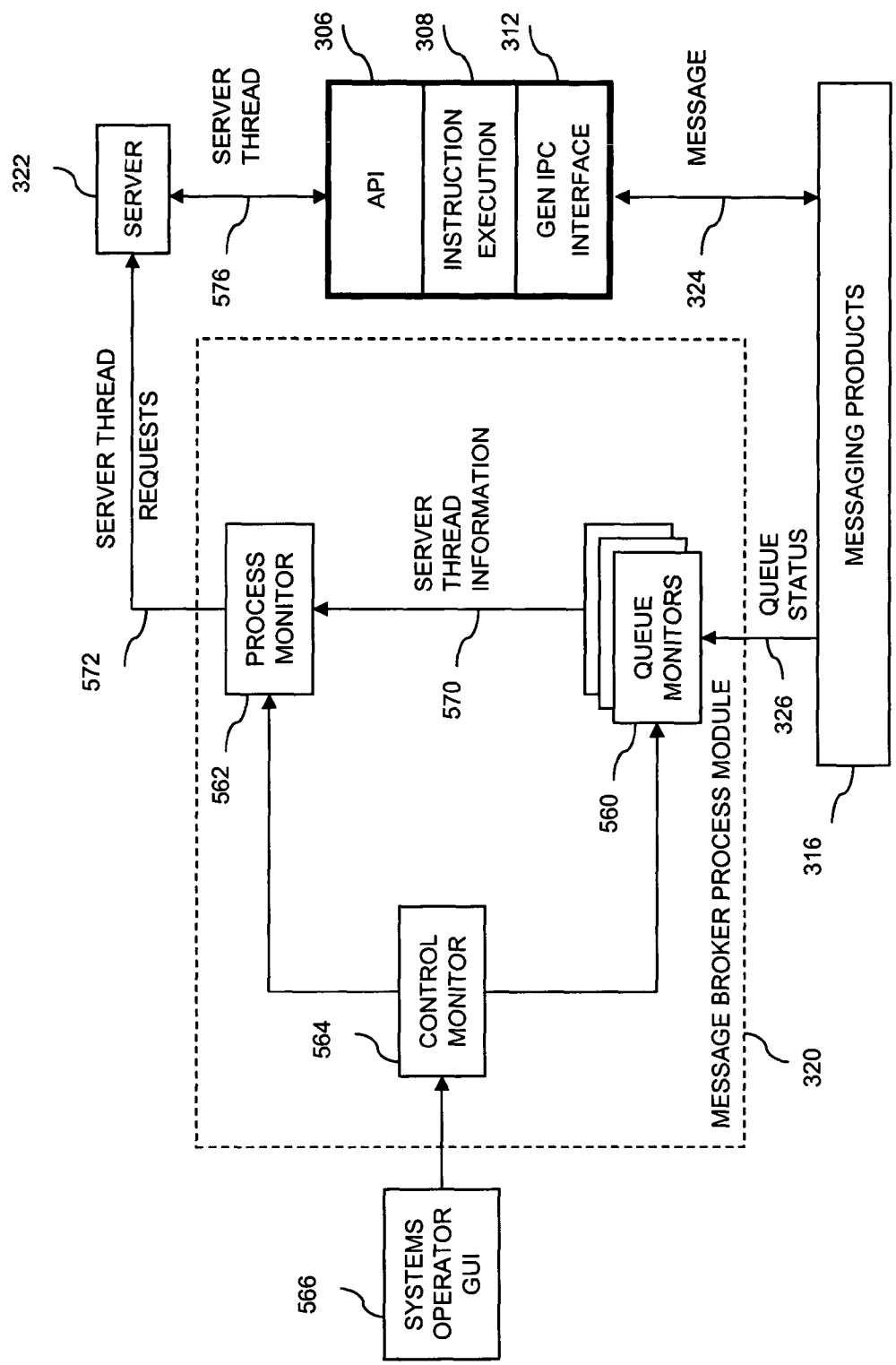
FIG. 5 is an exemplary diagram illustrating a message broker Process Monitor.

Referring to FIG. 5, the message broker process monitor 320 is shown in greater detail to illustrate its operation. The message broker process monitor 320 may include three primary components: a queue monitor (QM) 560, a process monitor (PM) 562, and a control monitor (CM) 564.

As server-bound messages are retrieved from the network 318 by the messaging products 316, they are held in queues pending retrieval by the message broker 304. Each queue is assigned a class of service to indicate its priority. Each queue monitor 560 is assigned to a queue or a range of queues, therefore to a class of service or range of classes. The queue monitor 560 monitors these queues by receiving queue status data 326 from the messaging products 316. By tracking which messages are released for server processing, the queue monitor 560 knows the server's current level of utilization and its capacity for handling additional messages. When the queue monitor 560 determines the server has sufficient resource capacity for handling additional messages, the queue monitor 560 selects a message from a specific queue for subsequent processing. It then sends to the process monitor 562 information 570 specified for a server thread 576 to retrieve the message. The server thread 576 represents a processing link between the operating system of the server 322 and registry 304. It may be used by the server application 322 to request and receive the client's message.

The process monitor 562 sends a request 572 to the server 322 to set up a thread by registering itself with the message broker 304. The server 322 then issues a register instruction to the message broker 304, establishing a session between the server 322 and the message broker 304, similar to the manner previously described with regard to the client 302. The server 322 then issues a RECEIVEREQUEST instruction, allowing it to receive the client's request message via the server thread 576.

The RECEIVEREQUEST instruction is received by the API 306 and passed to instruction execution 308 for processing. Instruction execution 308 validates the parameters. From the WS-REQUEST-MSG parameter, the message broker 304 knows where the message is and can retrieve it via the generalized IPC interface 312. The IPC interface 312 retrieves the message 324 and extracts the client's native request message from it. The extracted client's request message is then passed to the server 322 for application-specific processing.

The control monitor 564 serves a utility function, providing systems management and configuration for the message broker 304. For example, it may provide a graphical user interface (GUI) 566 to a systems operator to allow an operator to perform system administration functions. It also may allow the operator to modify the domain of queues managed by each queue monitor 560.

Referring to FIG. 3, after processing the client's request message, and if a reply is appropriate, the Server 322 issues a SENDREPLY instruction. This instruction includes the server's reply message as a parameter, which is identified as WS-SENDREPLY-MSG. This instruction may processed similarly to the SENDREQUEST instruction discussed previously.

Server-Side Preprocessing

Conventional models of decentralized computing where each user has a full-featured and independent microcomputer have displaced a centralized model in which multiple users used dumb terminals to work on a shared minicomputer or mainframe server. Networked personal computers may operate as "fat clients," often providing everything except some file storage and printing locally.

A thin client, on the other hand, is designed to be especially small so that the bulk of the data processing occurs on the server side. Thin clients can be advantageous, particularly in local area network environments. One benefit of thin clients is ease of maintenance: with fat clients, especially those suffering from poor networking support of various operating systems, installing a new application for all clients is likely to mean having to physically visit every user's workstation to install the application, or having to modify client-side configuration options; whereas with thin clients the maintenance tasks are centralized on the server and so need only be done once.

A thin client can be implemented by a web browser or other kind of user agent, often on a network personal computer or workstation. Browsers typically operate by requesting a resource identified by a Uniform Resource Locator (URL) from a network server, receiving markup in response, and rendering the markup for the user. The resource requested, received, and rendered is typically a hypertext file in the marked up in the HyperText Markup Language (HTML), the eXtensible Markup Language (XML), or other markup language such as the Standard General Markup Language (SGML), etc. Other exemplary thin clients include gopher clients; they are stateless and are not required to know how to interpret and display objects much more complex than menus and plain text. Gopher servers, on the other hand, can search databases and provide gateways to other services.

One way to develop client data entry applications is to use a server-side preprocessing language, an open source, server-side, scripting language embedded in markup language files used to create dynamic Web pages. When a user agent requests a server-side scripted file, the file is passed to a preprocessing engine, which reads the file line by line to determine and execute the instructions scripted in the file, and returns the markup generated by the preprocessor to the browser.

One server-side scripting language is known as the PHP Hypertext Preprocessor and others include Application Server Pages (ASP), and ColdFusion. With reference to PHP in particular, PHP script is enclosed in a hypertext document within special PHP tags. Because PHP is embedded within tags, the author of the code can alternate between markup and PHP instead of having to rely on heavy amounts of code to output hypertext markup. And, because PHP is typically executed on the server, the client does not view the PHP code, thus adding security to the system.

The Common Gateway Interface (CGI) is a specification for transferring information between a World Wide Web server and a CGI program. A CGI program is designed to accept and return data that conforms to the CGI specification. The program may be written in any programming language, including at least C, Perl, Java, or Visual Basic. CGI programs enable Web servers to interact dynamically with users. Many HTML pages that contain forms, for example, use a CGI program to process the form's data once it has been submitted. PHP can perform any task that any CGI program can perform, but its strength lies in its compatibility with many types of databases. Also, PHP can communicate across networks using Internet Message Access Protocol (IMAP), Simple Network Management Protocol (SNMP), Network News Transfer Protocol (NNTP), Post Office Protocol (POP3), or HyperText Transfer Protocol (HTTP).

Another way to provide dynamic feedback for Web users is to include scripts or programs that run on the user's machine rather than on the Web server. These programs may include Java applets, Java scripts, or ActiveX controls. These solutions are known collectively as client-side solutions, and require relatively fat clients.

Figure 6A:
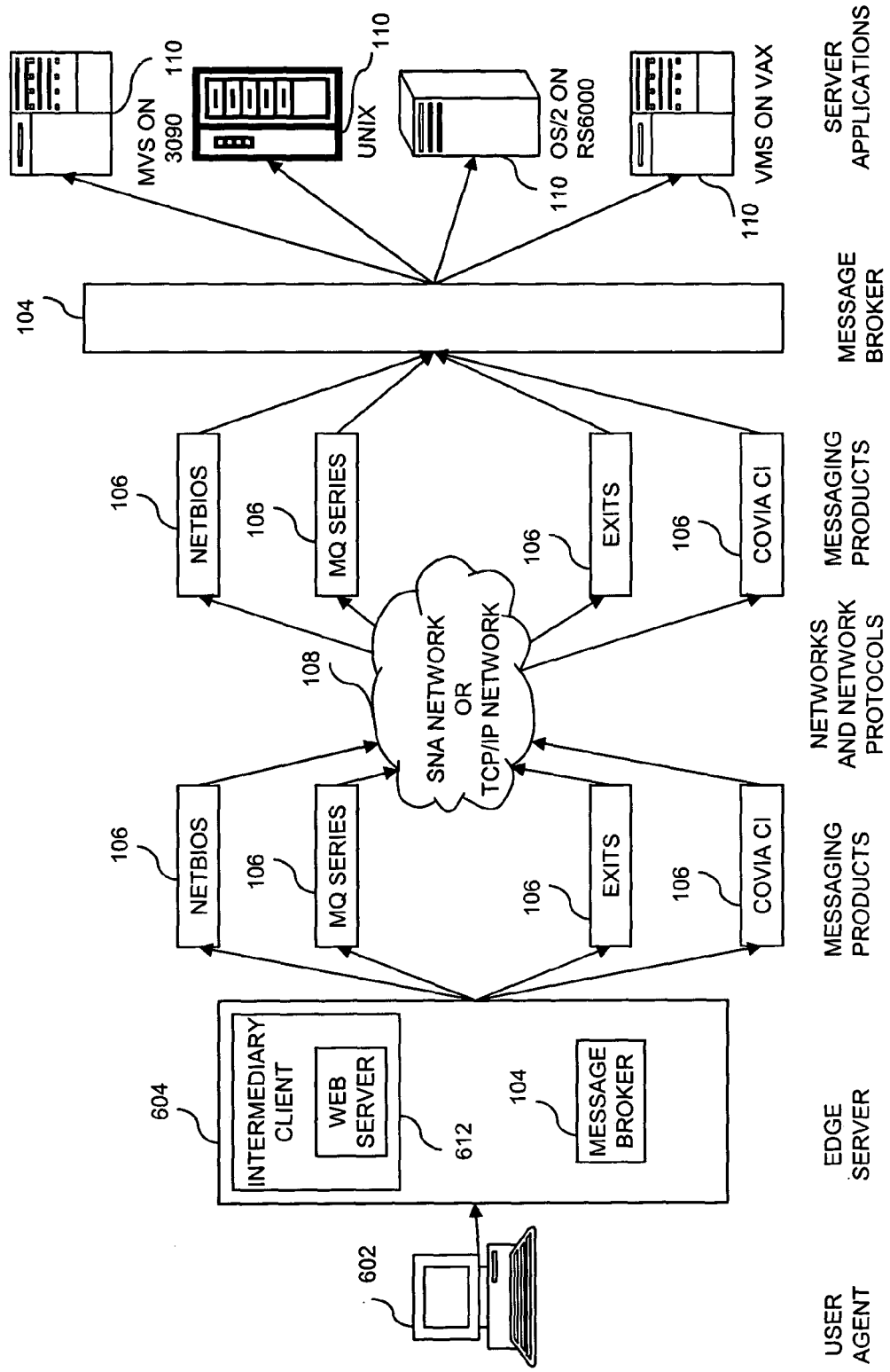
FIG. 6a is a diagram of a high-level systems architecture of an exemplary distributed computing platform utilizing an intermediary client communicating with a user agent and a message broker, according to an embodiment of the present invention.

Referring to FIG. 6a, an intermediary client 612 is depicted as an interface between a user agent 602 (e.g., a client browser) and the message broker 104, according to an embodiment of the present invention. For this example, the message broker 104 resides on an edge server 604, the same resource as the intermediary client 612, thus providing a single, standard interface to intermediary client 612 and server application 110 to advantageously shield these applications from the complexities of various proprietary messaging products 106 and network protocols 108. The operating systems, messaging products 106, and network protocols 108 shown are only a sample of those that may be supported by the message broker 104. By handling the interface between the user agent 602 and the message broker 104, the intermediary client 612, which may include a web server, enables user agents 602, which may be lightweight clients such as web browsers, to advantageously enjoy the benefits of communications utilizing the message broker 104 without exposure of the user agent 602 to overhead needed to utilize the message broker 104, as, in client/server applications, a thin client is designed to be especially small so that the bulk of the data processing occurs on the server. Additionally, it is possible that the user of the user agent 602 is unable to view code and messages sent by the intermediary client 612, and thus a level of security is added to the system. If an application of the intermediary client 612 is modified, the user agent 602 (e.g., a browser) may be easily updated by a user simply refreshing a display, instead of a server having to affirmatively deploy new versions of applications to a multitude of user machines.

The user agent 602 requests service from a server application 110, which may be on a server distant from the user agent 602. The request may be initiated by a user clicking a Uniform Resource Locator (URL) on a browser. This initial request may have caused the web server (e.g., the intermediary client 612) hosting the resource specified by the URL to access a file including, e.g., HTML and PHP tags. The intermediary client 612 parses the file, causing the web browser to transmit HTML to the user agent 602 for displaying a form for the user to complete. When the user completes the form and submits the information requested, the intermediary client 612 requests execution of the PHP code by an appropriate PHP engine. If the PHP code includes native instructions for the message broker 104, then the code is executed to appropriately transmit, via a request message, the information to the message broker 104 for further processing and transmission to the desired server application 110.

Message broker 104 accepts request messages from intermediary client applications 612 as part of a dialog. The intermediary client applications 612 may run under various operating systems, as indicated previously with regard to client applications 102. The request messages represent a solicitation for a response and/or an instruction to perform a process. They are generated by the intermediary client applications 612 with the intent of being delivered to the server application 110, which may include a distant server. Server application 110 may also be run under various operating systems, as shown. Since the message broker 104 software resides on the same hardware components as the applications, the message broker 104 and the intermediary client applications 612 are linked via a software process. Although only one user agent 602 is shown, many user agents 602 supported by many various operating systems and/or terminal emulators may communicate with the edge server 604, the intermediary client 612 and the message broker 104.

The message broker 104 then executes a process of encapsulating the intermediary client's 612 request message into a message-broker-defined message. This process is depicted in greater detail below. The message broker 614 determines the appropriate messaging product 106 and then converts the message into the proprietary protocol of this messaging product 106. In some situations, the message broker 614 may actually serve as the messaging product 106; in these cases, it will convert the message to the proprietary protocol of the network transport 108 (e.g., Systems Network Architecture (SNA) LU6.2, Transmission Control Protocol over Internet Protocol (TCP/IP), etc.).

The messaging product 106 will use an appropriate network protocol for transporting the message over an available network 108. At the other end, the messaging product 106 receives the message and passes it off to the server-side message broker 104. The message broker 104 converts the message from the proprietary protocol of the Messaging Product 106 to a message that is recognizable to the desired server application 110. If a response from the Server application 110 is appropriate, the preceding process is repeated to send the response message back to the intermediary client application 612, for potential processing and further delivery to the user agent 602.

Figure 6B:
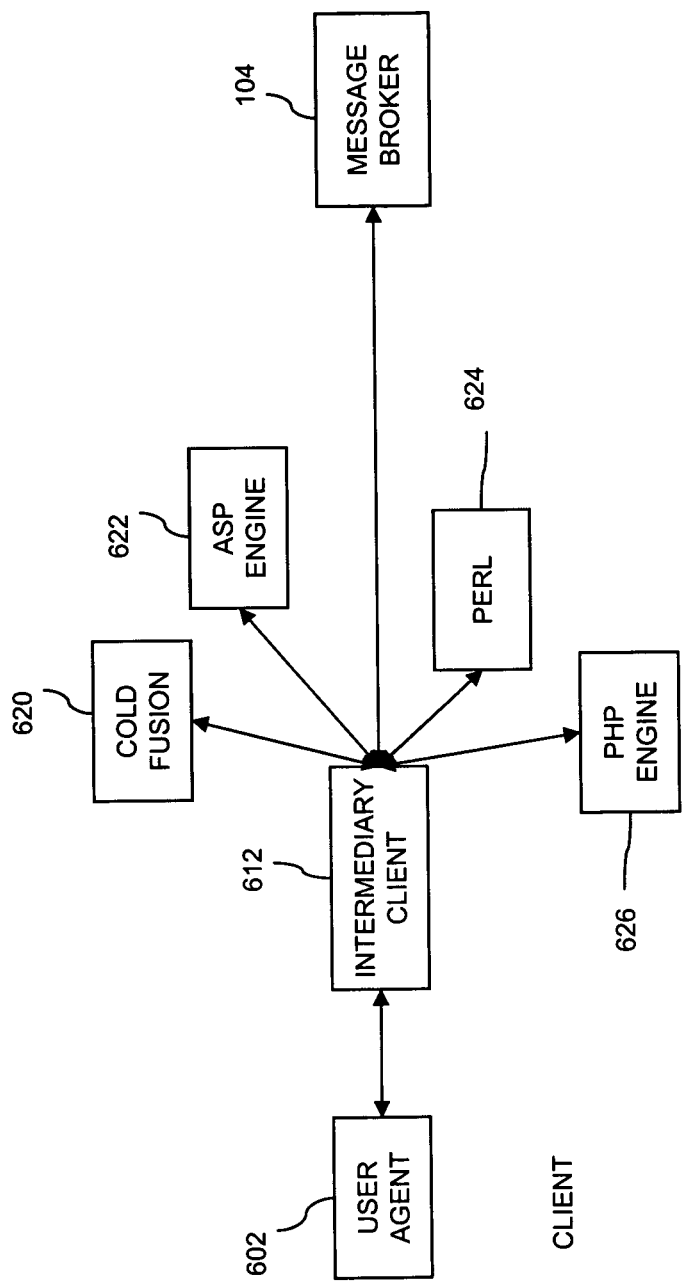
FIG. 6b is a block diagram illustrating the intermediary client communicating with a user agent, at least one application engine, and a message broker, according to an embodiment of the present invention.

FIG. 6b is a block diagram illustrating an exemplary intermediary client 612 communicating with an exemplary user agent 602 (e.g., a browser), at least one application engine 620, 622, 624, 626, and the message broker 104. For this exemplary system, a user interacts with information displayed by a browser (i.e., user agent 602) via data communicated with the browser (user agent 602) by the web server included in intermediary client 612. The communicated data may include HTML encoded data. The intermediary client 612 may include applications encoded using executable instructions such as PHP, ColdFusion, ASP or Perl instructions. Thus, the intermediary client 612 may parse application code, sending specific executable instructions such as PHP, ColdFusion, ASP or Perl instructions to a corresponding PHP engine 626, ColdFusion engine 620, ASP engine 622, or Perl engine 624 for execution. As part of the execution process, the intermediary client may send HTML instructions to the browser (user agent 602) via the web server, receiving information back from the browser via the web server, such as information obtained as responses to queries or on forms presented by the browser to the user.

The user may only receive information regarding display of forms or queries on the user's screen, and thus may not see information that is processed by the intermediary client 612 for transmission to the server applications 110 via the message broker 104.

The intermediary client 612 may obtain network destination information (e.g., domain, a service name, and a service qualifier) used by the message broker 104 for its instruction set by querying the user via the web server and the browser, or the intermediary client 612 may determine network destination of an application independently or from other sources. HTML including script code such as PHP, ASP, ColdFusion, or Perl code may be parsed by the intermediary client 612 for execution by appropriate engines. The code may include any of the instructions for using the message broker 104 so that data obtained, e.g., from the user via interaction with the browser included in user agent 602, may be processed by the intermediary client 612 to generate a message to be sent to the server application 110 via the message broker 104. Thus, if the server application 110 receives a request for information from a particular node in the network, the server application 110 may send a request, via the message broker 104, to the user agent 602, whereby the intermediary client 612 receives the message and generates an appropriate query or display screen for interactively obtaining data from the user agent 602. Alternatively, the intermediary client may be configured to communicate messages for applications written in, and thus compatible with, any programming language (e.g., Common Business Oriented Language (COBOL), Programming Language I (PL/I), FORmula TRANslator (FORTRAN), C, C++, Pascal, LISt Processing language (LISP), etc.).

If the user agent 602 desires sending information to a particular node on the network 108, the user may request, via a URL for a form or query provided by the web server included in the intermediary client 612, that the information obtained from the form be sent to the desired destination node. For this example, the user agent 602 is embodied as a thin client, and may only receive display data and transmit data in response to applications running on the edge server 604 handling the user agent's 602 needs.

Figure 7A:
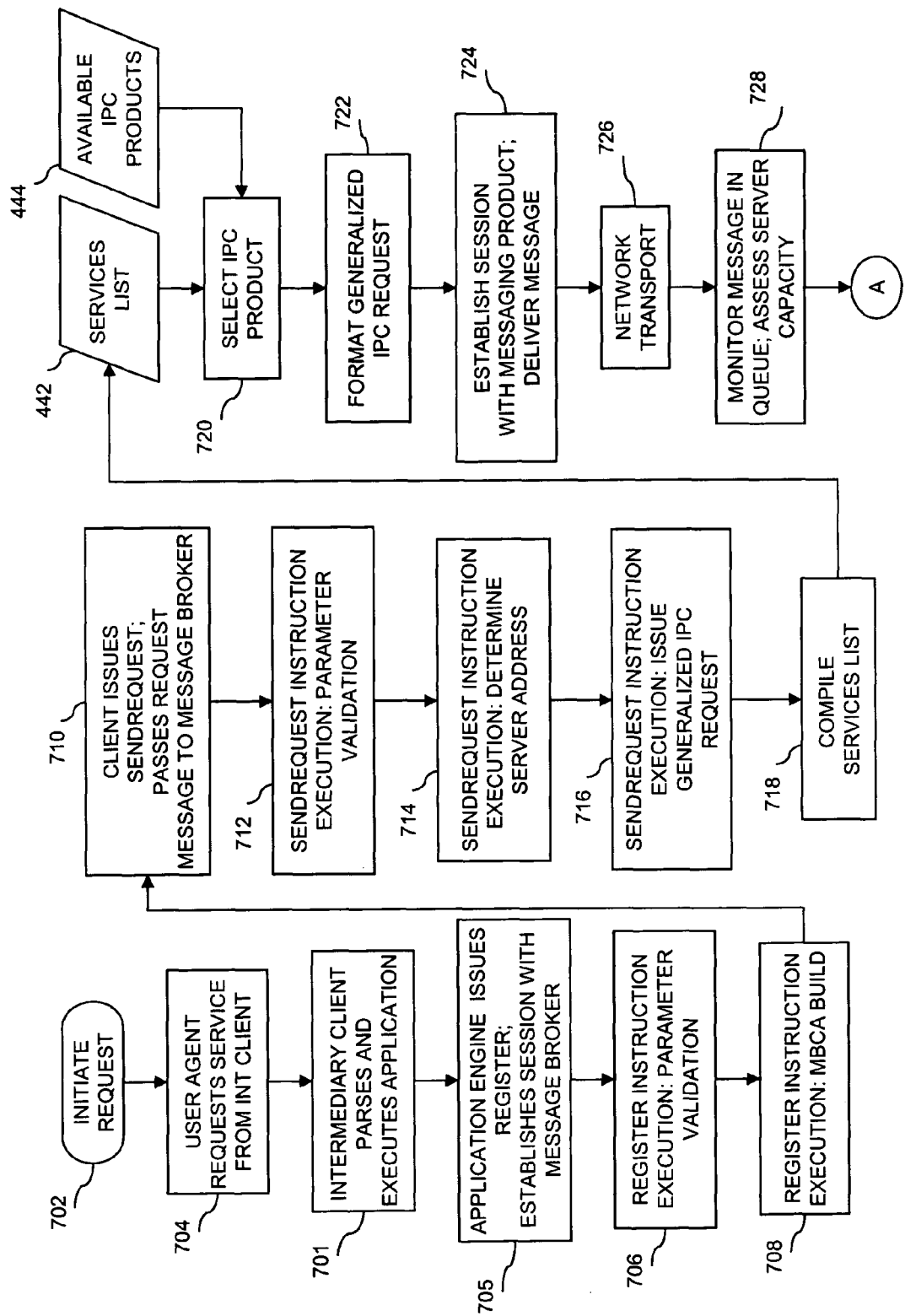
FIG. 7a is a flowchart of a process for operation of the intermediary client in communication with the user agent and the message broker, according to an embodiment of the present invention.

Referring to FIG. 7a, a process flowchart illustrates exemplary steps performed when an intermediary client communicates via the message broker 104 when the intermediary client issues a SENDREQUEST instruction to send a message to a Server Application 110. A similar operation may be conducted if a CONVERSE instruction were utilized.

In step 702, the user agent 602 initiates a request for a server application 110 to process. This request is to be delivered to the server application 110, which may reside on a distant machine. In step 704, the user agent 602 requests service from an intermediary client 612 (e.g., a web server included with the intermediary client 612). This request, for example, may take the format of requesting a form by a user selecting, or clicking on a link specifying a Uniform Resource Locator, filling in information on a form displayed by the user agent's 602 browser by a web server included in the intermediary client 612, and selecting a submit button. In step 701, the intermediary client 612 may recognize intermediary-client-specific instructions which the intermediary client 612 may process utilizing engines 620, 622, 624, 626 appropriate for processing the instructions (e.g., PHP, ColdFusion, Perl, ASP).

In step 705, the engine 620, 622, 624, or 626 issues a REGISTER instruction to the message broker 104. The REGISTER instruction establishes a communications session between the intermediary client 612 and message broker 104. The instruction execution component 308 of the message broker 104 validates the parameters of the REGISTER instruction (step 706) and builds a message broker control area (MBCA), which includes a memory allocation used for passing instruction parameters (including the client's message) between the intermediary client 612 and the message broker 104 (step 708).

The intermediary client 612, in step 710, issues a SENDREQUEST verb to the message broker 104. The intermediary client 612 sends its request message as a parameter of the SENDREQUEST instruction. The instruction execution component 308 of the message broker 104 validates the parameters of the SENDREQUEST verb (step 712) and determines the physical network routing address of the intended server application 110 by extracting the server application name from the intermediary client's 612 message and translating that name to a network destination via a query to the directory services database 310 (step 714). The directory services database 310 will return a network destination in the form of a domain, a service name, and a service qualifier, as discussed previously.

In step 716, the instruction execution component 308, as part of processing the SENDREQUEST instruction, issues a generalized IPC request 440 to the generalized IPC interface 312. The generalized IPC request 440 instructs the IPC interface 312 to perform certain functions for delivering the message, as discussed below. The generalized IPC request 440 also includes the intermediary client's 612 message and the server's 110 network address.

With continued reference to FIG. 7a, in step 718, the generalized IPC interface request processor 430 compiles a list of services that are appropriate for processing the generalized IPC request 440. These services may be performed by the messaging product 316. The services list 442 that is generated is used by the IPC product qualification component 432 in step 720 to select an IPC product. The IPC product qualification 432 also receives the list of available IPC products 444 from the available services information database 436.

In step 720, the IPC product qualification 432 matches the required services from the services list 442 to those offered from certain IPC products identified in the available IPC products list 444, and selects an appropriate IPC product. The selected IPC product may include a messaging product 316 and/or a data network 318 transport protocol. Identification of the selected IPC product is then sent to the IPC messaging interface component 434.

In step 722, the IPC messaging interface component 434 formats the generalized IPC request 440 (which it has received from instruction execution 308) into a message that may be proprietary to the selected IPC product. The procedures for this translation of formats, e.g., may have been programmed into the IPC messaging interface component 434. Then, in step 724, the Interface 434 establishes a communications session with the selected messaging product 316 in a manner that is appropriate for the selected messaging product 316. Once the session is established, the message is passed to the messaging product 316, which proceeds to deliver the message over the network 108. At this point, the referenced "message" includes the intermediary client's 612 native request message packaged in an envelope that the message broker 104 has formatted specifically for the selected IPC products.

The message is transported in step 726 over the network 108 in a manner that is appropriate for the particular network protocol that is in use.

In step 728, the message broker 104 at the Server 110 site is prepared to receive the message. A queue monitor (QM) component 560 of the message broker process monitor 320 monitors the message in a particular queue by receiving queue status data 326 from each of the connected messaging products 316. The queue monitor 560 also tracks server resource capacity by being programmed with initial server capacity and tracking each message that is sent to the server 110. Thus, the queue monitor 560 knows the current server utilization and its capacity for processing additional messages. As part of step 728, the queue monitor 560 assesses the current capacity of the server 110 and determines when the next message may be retrieved.

Figure 7B:
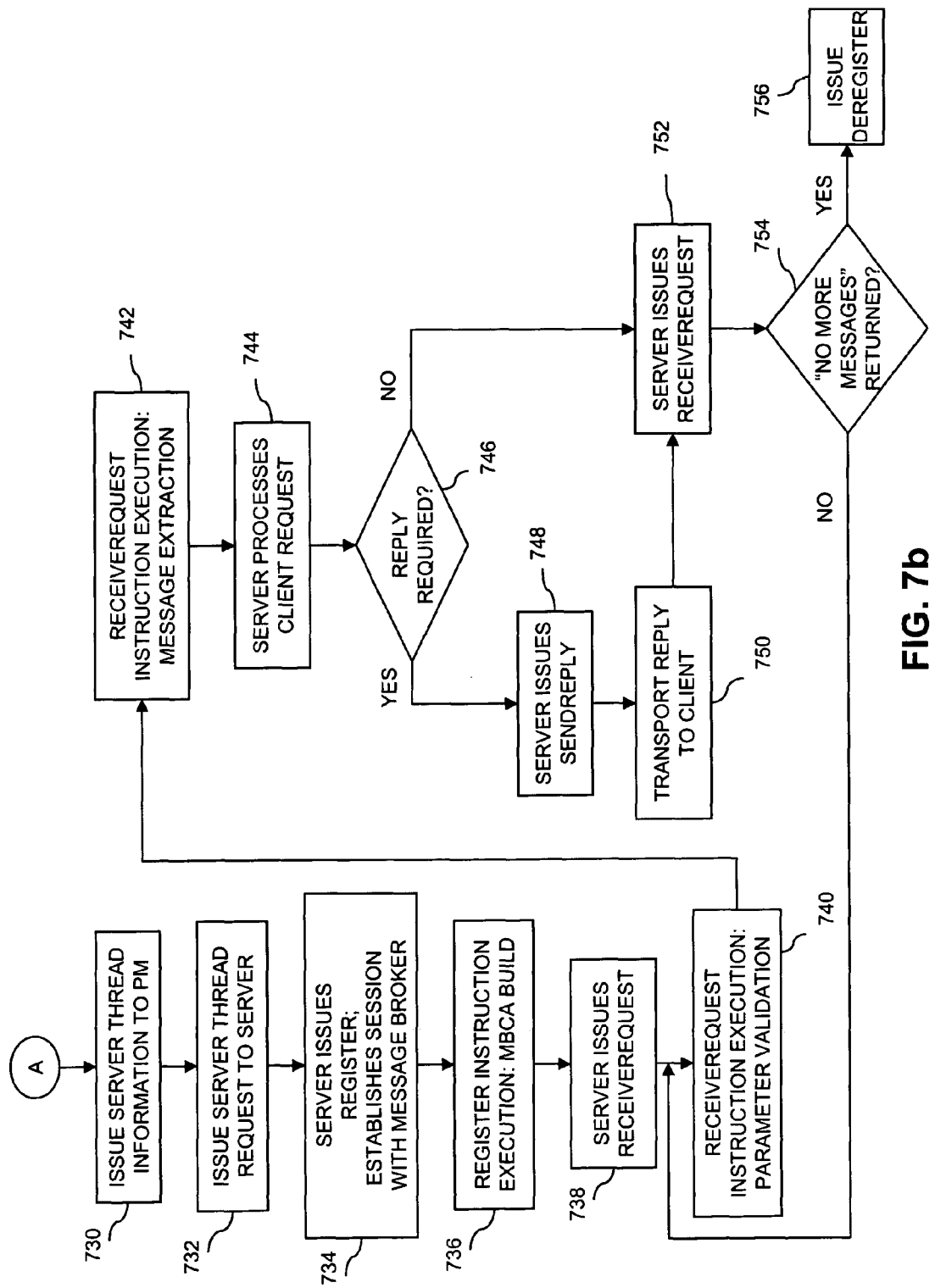

Referring to FIG. 7b, in step 730, the queue monitor 560 determines that the next message is to be retrieved and issues information 570 for a server thread 576. The server thread 576 represents a processing link between the operating system of the server 102 and message broker 104, and may be used by the server application 110 to request and receive the message. The server thread information 570 is issued by the queue monitor 560 to the process monitor (PM) 562.

In step 732, the process monitor 562 issues a request 572 for a server thread to the operating system of the server 110. This serves as a trigger for the server application 110 to establish a session with the message broker 104, by issuing a REGISTER instruction.

Then, in step 734, the server 110 issues the REGISTER instruction, which is read by the message broker's API 306 and passed to instruction execution 308, thus establishing the server's session with the message broker 104.

In step 736, instruction execution 308 processes the server's 110 REGISTER instruction similarly to the processing of the intermediary client's 612 REGISTER instruction. It builds an MBCA that is specific to the current session. Then, in step 738, the server 110 issues a RECEIVEREQUEST instruction to the message broker 104. The RECEIVEREQUEST instruction instructs the message broker 104 to send the intermediary client's 612 message to the Server 110.

In step 740, the instruction execution process 308 validates the parameters of the RECEIVEREQUEST instruction. One of these parameters will be populated with the address in memory of the intermediary client's 612 request message. In step 742, instruction execution 308 extracts the intermediary client's 612 native request message from the packaged message that was delivered over the network 108, and passes the request message to the server 110.

The server 110, in step 744, processes the intermediary client's request message in a manner that is specific to the application and independent of the message broker 104. A server 110 reply to the intermediary client 612 request may or may not be required, as determined in step 746. If a reply is required, the server 110 issues a SENDREPLY instruction in step 748, which is processed in the same manner as an intermediary client's 612 SENDREQUEST instruction, beginning in step 710. The server's 110 reply is then delivered to the intermediary client 612, as indicated in step 750. The server 110 then proceeds to issue another RECEIVEREQUEST instruction in step 752.

If a reply is not required, as determined in step 746, the server 110 issues another RECEIVEREQUEST instruction in step 752. If no more request messages are in queue for the server 110, a message stating "No More Messages" is returned to the server 110 from message broker 104, as indicated in step 754. Then the process ends with step 756, in which the server 110 issues a DEREGISTER instruction. The DEREGISTER instruction instructs the message broker 104 to end the session.

If, in step 754, the "No More Messages" message is not returned, an assumption is made that more request messages are in queue. The process returns to step 740, in which the instruction execution 308 processes the RECEIVEREQUEST instruction by validating the parameters.

Hardware Overview

Figure 8:
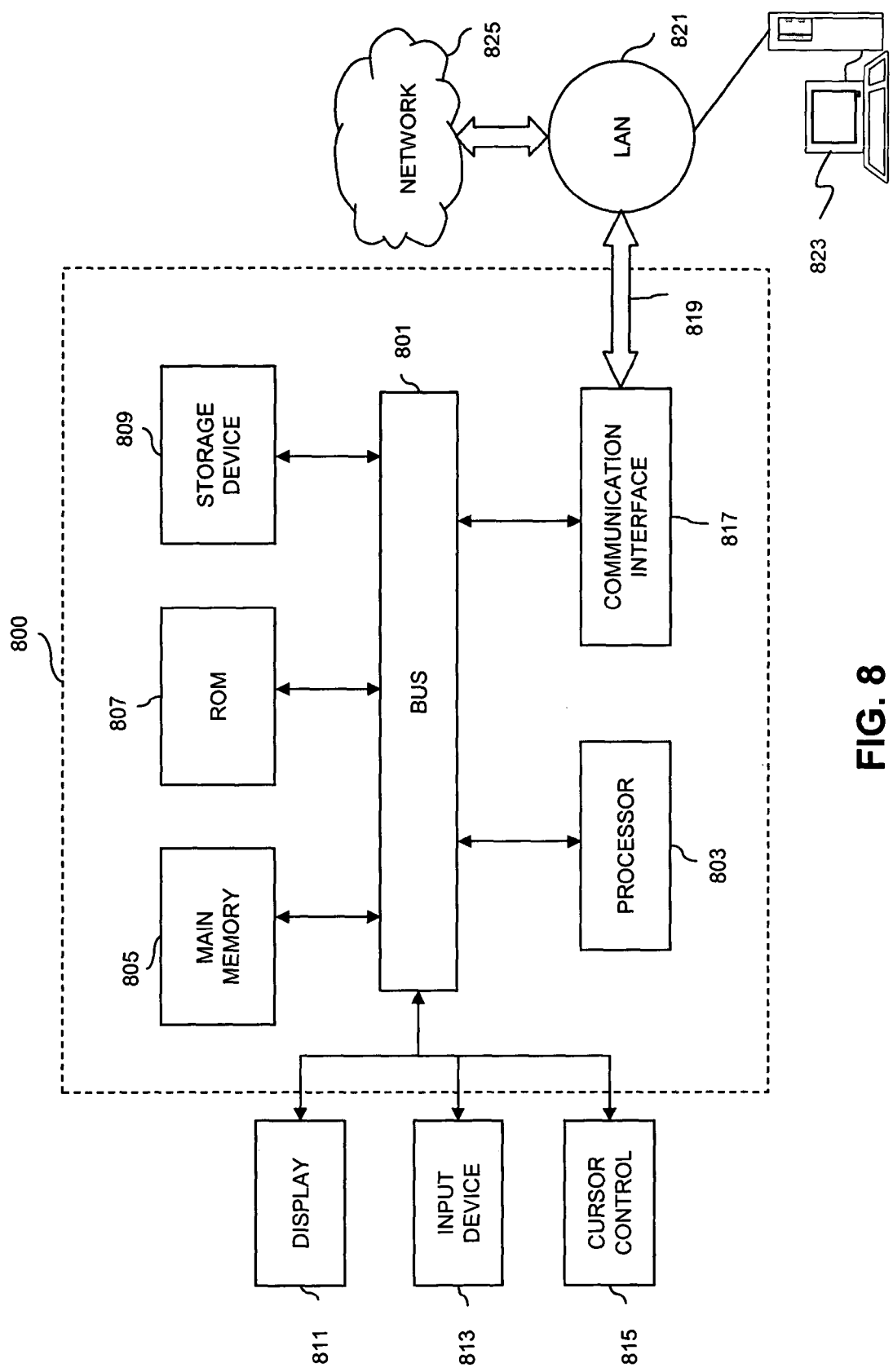
FIG. 8 is a diagram of a computer system that can be used to implement an embodiment of the present invention.

FIG. 8 illustrates a computer system 800 upon which an embodiment according to the present invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the processes of the intermediary client 612 and the message broker 104 are provided by at least one computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging to an application program for implementing an embodiment of the present invention through the network 825, local network 821 and communication interface 817. The processor 803 may execute the transmitted code while being received and/or store the code in storage device 809, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by the processor.

While the present invention has been described in connection with a number of embodiments and implementations, the present invention is not so limited but covers various obvious modifications and equivalent arrangements, which fall within the purview of the appended claims.

What is claimed is:

1. A distributed system, comprising:
   a first message broker configured for encapsulating and exchanging a message among a plurality of clients and servers using incompatible protocols;
   an intermediary client interfacing the first message broker and a user agent, and configured for generating the message, wherein a user of the user agent is unable to view the message generated by the intermediary client;
   a second message broker configured for communicating with the first message broker over a data network, the second message broker interfacing an application server;
   a storage device for storing a resource remote from a user agent, said resource containing markup source and at least one instruction for calling the second message broker to communicate the message to an application at the application server; and
   a preprocessor configured for preprocessing the resource in response to a communication from the user agent specifying the resource, the preprocessing including:
   in response to executing the at least one instruction, calling the second message broker based on the communication to communicate the message to the application at the application server in a protocol not supported by the user agent;
   generating markup based on the markup source contained in the resource; and
   sending the generated markup to the user agent.

2. A distributed system according to claim 1, wherein:
   the communication from the user agent includes a parameter specifying the application; and
   said calling the second message broker to communicate the message to the application is further based on the parameter specifying the application.

3. A distributed system according to claim 1, wherein the user agent includes a browser.

4. A distributed system according to claim 1, wherein the intermediary client includes a web server and resides on an edge server along with the first message broker.

5. A distributed system according to claim 1, wherein the resource includes a file containing the markup source and the at least one instruction, said at least one instruction including a server-side preprocessing instruction.

6. A distributed system according to claim 5, wherein the server-side preprocessing instruction includes one of a Hypertext Preprocessor (PHP) instruction, an Active Server Pages (ASP) instruction, a Perl instruction, and a ColdFusion instruction.

7. A distributed system according to claim 5, wherein the server-side preprocessing instruction includes a call to the second message broker via an application programming interface implemented by the first message broker.

8. A distributed system according to claim 7, wherein the application programming interface implemented by the first message broker includes at least a register instruction for initiating a session.

9. A distributed system according to claim 1, wherein said preprocessing further includes:
   receiving a reply from the application via the second message broker; and
   generating the markup based further on the reply from the application.

10. A distributed system according to claim 1, wherein the first message broker is configured to determine a current address of a network node of the application server.

11. A method of communicating a message in a distributed computer system from a user agent to an application at an application server, comprising:
   generating, by an intermediary client, the message;
   receiving a communication via a first message broker from the user agent identifying a resource stored remote from the user agent, said resource containing markup source and at least one instruction for calling a second message broker based on the communication to communicate the message to the application at the application server; and
   preprocessing, by a hypertext server, the resource specified in the communication, said preprocessing including:
      in response to executing the at least one instruction, calling the second message broker based on the communication to communicate the message to the application at the application server in a protocol not supported by the user agent; and
      generating markup based on the markup source contained in the resource; and
      sending the generated markup to the user agent,
   wherein the intermediary client interfaces the first message broker and the user agent, and a user of the user agent is unable to view the message generated by the intermediary client.

12. A method according to claim 11, wherein:
   the communication from the user agent includes a parameter specifying the application; and
   said calling the message second broker to communicate the message to the application is further based on the parameter specifying the application.

13. A method according to claim 11, wherein the user agent includes a browser.

14. A method according to claim 11, wherein the resource is stored at a web server.

15. A method according to claim 11, wherein the resource includes a file containing the markup source and the at least one instruction, said at least one instruction including a server-side preprocessing instruction.

16. A method according to claim 15, wherein the server-side preprocessing instruction includes one of a Hypertext Preprocessor (PHP) instruction, an Active Server Pages (ASP) instruction, a Perl instruction, and a ColdFusion instruction.

17. A method according to claim 15, wherein the server-side preprocessing instruction includes a call to the second message broker via an application programming interface implemented by the first message broker.

18. A method according to claim 17, wherein the application programming interface implemented by the first message broker includes at least a register instruction for initiating a session.

19. A method according to claim 11, wherein said preprocessing further includes:
   receiving a reply from the application via the second message broker; and
   generating the markup based further on the reply from the application.

20. A method according to claim 11, wherein the first message broker is configured to determine a current address of a network node of the application server and to encapsulate messages among a plurality of clients and servers using incompatible protocols.

21. A non-transitory computer-readable medium storing, remote from a user agent, a resource containing markup source and one or more instructions for communicating a message in a distributed computer system from the user agent to an application at an application server, said one or more instructions being configured, when preprocessed by a hypertext server in response to a communication received by a first message broker from the user agent identifying the non-transitory computer-readable medium, to cause one or more processors to perform the steps of:
   calling a second message broker to communicate the message based on the communication to the application at the application server in a protocol not supported by the user agent; and
   generating markup based the markup source contained in the resource,
   wherein the message is generated by an intermediary client interfacing the first message broker and a user agent, and a user of the user agent is unable to view the message generated by the intermediary client.

22. A non-transitory computer-readable medium according to claim 21, wherein:
   the communication from the user agent includes a parameter specifying the application; and
   said calling the second message broker to communicate the message to the application is further based on the parameter specifying the application.

23. A non-transitory computer-readable medium according to claim 21, wherein the user agent includes a browser.

24. A non-transitory computer-readable medium according to claim 21, wherein the hypertext server includes a web server.

25. A non-transitory computer-readable medium according to claim 21, wherein the resource includes a file containing the markup source and said one or more instructions, said one or more instructions including a server-side preprocessing instruction.

26. A non-transitory computer-readable medium according to claim 25, wherein the server-side preprocessing instruction includes one of a Hypertext Preprocessor (PHP) instruction, an Active Server Pages (ASP) instruction, a Perl instruction, and a ColdFusion instruction.

27. A non-transitory computer-readable medium according to claim 25, wherein the server-side preprocessing instruction includes a call to the second message broker via an application programming interface implemented by the first message broker.

28. A non-transitory computer-readable medium according to claim 27, wherein the application programming interface implemented by the first message broker includes at least a register instruction for initiating a session.

29. A non-transitory computer-readable medium according to claim 21, wherein said one or more instructions are further configured to perform the steps of:
   receiving a reply from the application via the second message broker; and
   generating the markup based further on the reply from the application.

30. A non-transitory computer-readable medium according to claim 21, wherein the first message broker is configured to determine a current address of a network node of the application server and to encapsulate messages among a plurality of clients and servers using incompatible protocols.

* * * * *